Aug. 13, 1935.  P. L. MORELL  2,010,877
SAFE BOX FOR MOTOR VEHICLES
Filed Dec. 4, 1933
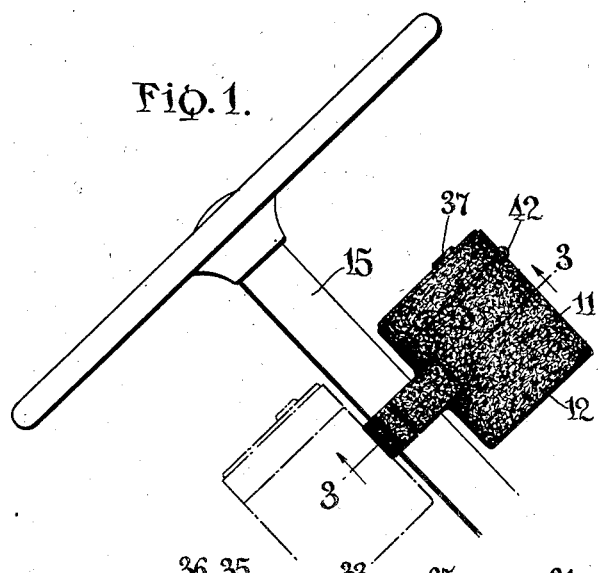
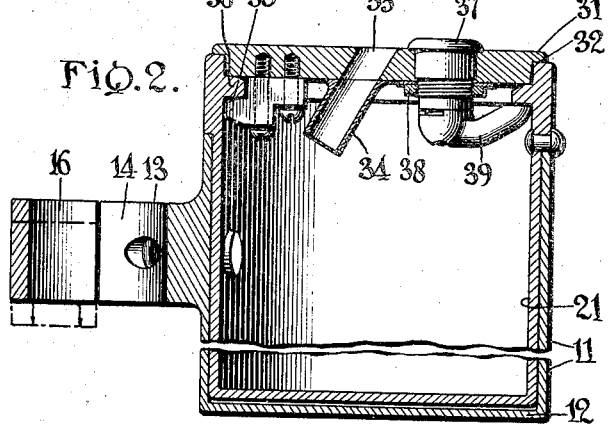
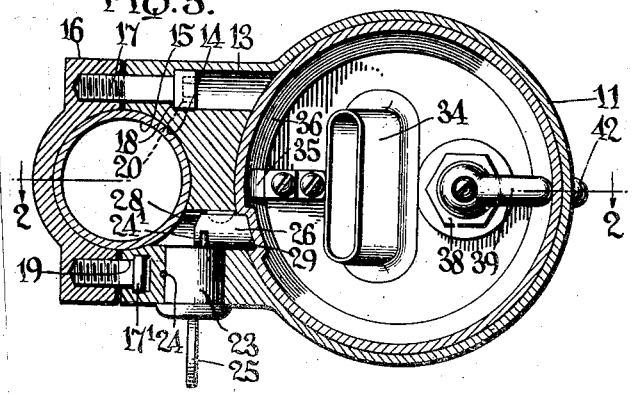
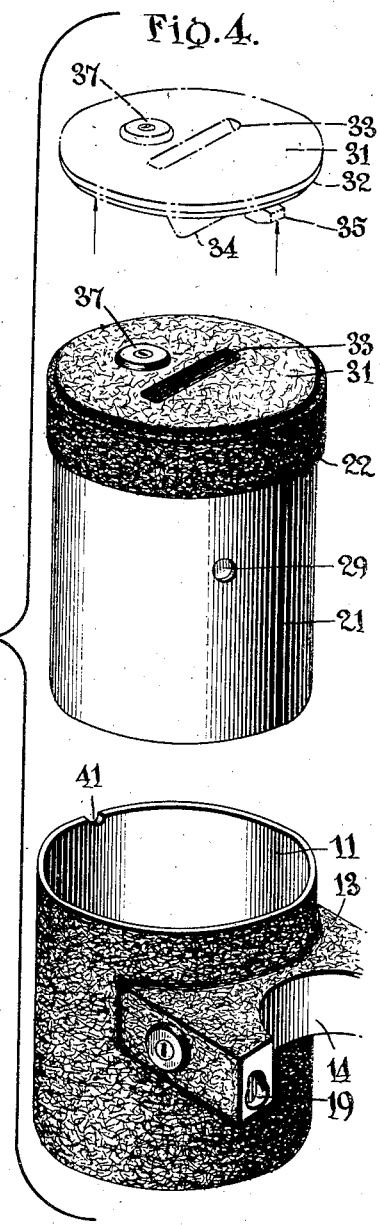
INVENTOR
Peter L. Morell,
BY
*Beau & Brooks.*
ATTORNEYS Patented Aug. 13, 1935

2,010,877

UNITED STATES PATENT OFFICE 2,010,877

SAFE BOX FOR MOTOR VEHICLES

Peter L. Morell, Kenmore, N. Y.

Application December 4, 1933, Serial No. 700,913

6 Claims. (Cl. 232—1)

The present invention relates to protective devices for safeguarding the transportation by motor vehicles of money and other valuable articles.

In the present day conduct of business, money and other valuable articles are frequently transported by automobiles or trucks and very frequently merchandise is delivered and money collected by a person driving such a motor vehicle, so that the driver of the vehicle carries large sums of money from the point of collection to a home office or bank. The present invention contemplates the safeguarding of such money and other valuable property and also of protecting the driver, by providing on the vehicle a safety receptacle into which such money or valuables may be inserted upon collection, and from which the contents may not be removed by anyone, including, if desired, the collector or operator of the vehicle, except an authorized person.

According to the invention, a receptacle designed to resist opening or removal of contents by unauthorized persons is affixed to a permanent part of the vehicle in such manner that it cannot be removed from the vehicle by unauthorized persons except by extensive dismantling of the vehicle. Means are provided to enable the insertion of money and other valuables into the receptacle, and means are also provided whereby an authorized person may remove the contents when, for example, the vehicle has returned to the office or bank.

In addition, means may be provided to enable such an authorized person to remove the unopened receptacle from the vehicle, so that it may be opened, or its contents removed, in a place inaccessible to the vehicle. To this end, the invention contemplates a holder into which the receptacle may be locked against removal by unauthorized persons, and which is adapted to be more or less permanently affixed to the vehicle.

These and other objects and advantages, including those inherent in the arrangement and formation of the component parts, will become apparent from the following description of the one typical embodiment of the invention illustrated in the accompanying drawing, wherein:

Fig. 1 is a side elevation showing the receptacle mounted upon the steering column of a vehicle;

Fig. 2 is a fragmentary vertical section taken upon line 2—2 of Fig. 3;

Fig. 3 is a cross-section taken upon line 3—3 of of Fig. 1; and,

Fig. 4 is a perspective view of the device with the container removed from the holder and the cover being shown by broken lines as removed from the container.

As illustrated the device includes a tubular metallic holder 11 closed at the bottom by wall 12. Joined to the holder, either integrally or by welding or by other fastening means, is a saddle 13 recessed at 14 to seat upon the steering column 15 of the vehicle. A clamp 16, connected to saddle 13 on opposite sides of recess 14, serves to secure the holder to the vehicle.

The connection between the clamp and saddle includes a pair of hardened metal screws 17, 17'. Screw 17 is inserted from the interior of holder 11 through a bore formed through saddle 13 and is threaded into the body of the clamp. The head of screw 17 abuts against shoulder 18 formed in the bore of the saddle and is provided with a wrench socket 20 to enable its insertion and removal. Screw 17' is also threaded into the clamp with a portion of its head and shank protruding for engagement in a key-hole socket 19 formed in the saddle 13. In attaching the holder to a steering column the head of screw 17' is inserted in the wide portion of the key-hole socket, and the clamp is then slid longitudinally of the steering column to align the screw 17' with the narrow portion of the key-hole socket, and the screw 17 is then applied. To effect removal of the holder it is necessary to reverse the above-described sequence of operations, since the head of screw 17' can be withdrawn from the key-hole socket 19 only after longitudinal movement of the clamp along the steering column to a position such as indicated by broken lines in Fig. 2, and since such movement can be effected only after removal of screw 17. It will be understood that the device can be placed in any convenient position on the steering column, such as that shown in full lines or that shown in broken line on Fig. 1.

Seated within the bore of the holder is tubular metallic receptacle 21 having a closed bottom and having a shoulder 22 adjacent its upper end for seating upon the upper edge of the holder. The receptacle is locked to the holder, to prevent unauthorized removal therefrom, by locking means. The latter includes a barrel type lock 23 secured within saddle 13 by any suitable means such as by a key engaging recess 24 in the surface of the lock body. The barrel of the lock, which is rotatable by key 25, carries an eccentric pin 24' engaging a detent pin 26. The pin is slidable in guideway 28 formed in the saddle 13 and holder 11 in alignment with a recess 29 in the receptacle. In the position illustrated in Fig. 3, the pin 26 is engaged in recess 29 so that the receptacle is locked to the holder, and in order to release it, the key 25 and barrel of the lock must be turned to retract the pin from the recess.

Removable closure 31 seats within the upper end of the receptacle and has a peripheral flange 32 abutting the edge of the receptacle. An elongated slot 33 of sufficient size to pass large coins and folded paper currency, is formed through the closure, preferably being inclined as indicated in Figs. 1 and 2. In alignment with the slot is a tubular chute 34 which may be formed integrally with the bottom of the closure or be secured thereto by any suitable means, such as by soldering. Also secured or formed upon the bottom of the closure is a finger 35 engaging beneath an annular ridge 36 that extends about the upper inner surface of the receptacle.

Extending through the closure at a point substantially opposite from the finger 35 is a closure lock 37, of the rotatable barrel type, and held in place by securing means, such as nut 38, which is accessible only upon removal of the closure. The barrel of the lock, which may be rotated only by its key (not shown), carries a detent finger 39 normally engaging under the ridge 36. Upon partial rotation of the lock barrel to disengage finger 39 from ridge 36, the closure 31 may be removed.

In use, an operator or passenger of the vehicle may insert money or other valuables into the receptacle through the slot 33. The keys for locks 23 and 37 may be kept at some one or more designated places so that in the event of an attempted robbery along the route of the vehicle it will be impossible to remove either the receptacle or its contents from the vehicle without destruction of the heavy metallic parts. Upon arrival of the vehicle at such a designated place, key 25 may be used to turn lock 23 and thus enable removal of the receptacle to any place where it is desired to open it, by turning lock 37 and lifting the closure. Or, if desired, access to the contents of the receptacle may be obtained without removing the receptacle from the vehicle, merely by turning lock 37 and lifting the closure 31.

In relocking the receptacle into the holder it is necessary that the recess 29 be aligned with guideway 28. To facilitate such allineation a notch 41 is formed in the upper edge of holder 11 and an interfitting projection is provided on the receptacle 21. The projection constitutes a rivet 42 extended through the receptacle adjacent shoulder 22. The projection and notch provide a visual indication for alignment, and also a mechanical aid to alignment since the receptacle, after being inserted in the holder, may be rotated until the projection drops into the notch, at which time proper alignment is attained.

It will be understood that the device herein described is merely illustrative of the inventive principles involved and not restrictive, and that the invention may be embodied in other structural forms and arrangements without departing from the spirit and scope of my invention as claimed.

What is claimed is:

1. In a device of the class described, a tubular holder, a receptacle removably supported within the holder, locking means carried by the holder and cooperating with the receptacle for locking the receptacle to the holder, a removable closure for the receptacle having a restricted opening for the insertion of articles into the receptacle, and second locking means carried by the closure and cooperating with the receptacle for locking the closure to the receptacle, whereby the receptacle with the closure locked thereto may be removed from the holder upon unlocking of the first mentioned locking means, or the closure may be removed from the receptacle upon unlocking of the second locking means without unlocking the first mentioned locking means.

2. In a safety receptacle for attachment to a motor vehicle, a tubular holder, a cylindrical receptacle adapted to be telescoped within the tubular holder and having at one end a shoulder for abutment with an edge of the tubular holder, a lock controlled detent movably mounted within the holder, and a recess in a telescoped portion of the receptacle for engagement by the detent, and an interfitting recess and projection on said shoulder and edge for aligning the receptacle and holder in order to permit of engagement of the detent with the first mentioned recess.

3. In a device of the class described for attachment to a steering column, a tubular holder having a saddle formed therewith for seating upon the column, a clamp connected to the saddle for cooperating therewith in embracing said column, a tubular receptacle removably supported within the holder, and locking means for securing the receptacle within the holder, the connection between the clamp and saddle comprising releasable means extending between the clamp and saddle and accessible for release from the interior of the holder when the receptacle is removed therefrom.

4. In a device of the class described, a saddle member for seating upon a steering column, a clamp member cooperating with the saddle to embrace the column, and fastening means at substantially opposite sides of the column connecting the saddle and clamp, the fastening means at one side comprising a key-hole socket in one of said members and an interlocking projection on the other of said members, the projection being interlockable with the socket upon relative movement of the members longitudinally of the column, and the fastening means at the other side of the column comprising a fastener extending through aligned openings in said members and preventing relative movement of said members longitudinally of the column.

5. As an article of manufacture, a device attachable to a motor vehicle for housing valuable articles, comprising a tubular holder and a member adapted to be locked to the holder, said holder having a saddle part for engagement with the steering column of the vehicle, a clamp cooperating with the saddle part in embracing the steering column; permanent fastening means connecting the saddle part and clamp whereby the holder cannot be removed from the steering column except by the destruction of the device or a portion thereof, a detent guideway formed within the saddle part, a detent slidable therein, and lock controlled means mounted in the saddle part for moving said detent, and a detent engaging portion on said member adapted for alignment with said guideway whereby the detent may be engaged therewith by the lock controlled means to lock said member to the holder, said detent being inaccessible when the holder is attached to the vehicle and said member is locked to the holder.

6. In a device of the class described, a tubular holder having a saddle formed therewith, a clamp cooperating with the saddle to embrace a vehicle steering column, a receptacle removably telescoped within the holder, lock controlled means for retaining the receptacle within the holder, and securing means accessible only from the holder interior when the receptacle is removed therefrom for joining the saddle and clamp.

PETER L. MORELL.